June 2, 1942. E. VOSSEN 2,285,237
ELECTRIC STOP MOTION CONTROLLER FOR KNITTING MACHINES
Filed Dec. 29, 1941    2 Sheets-Sheet 1
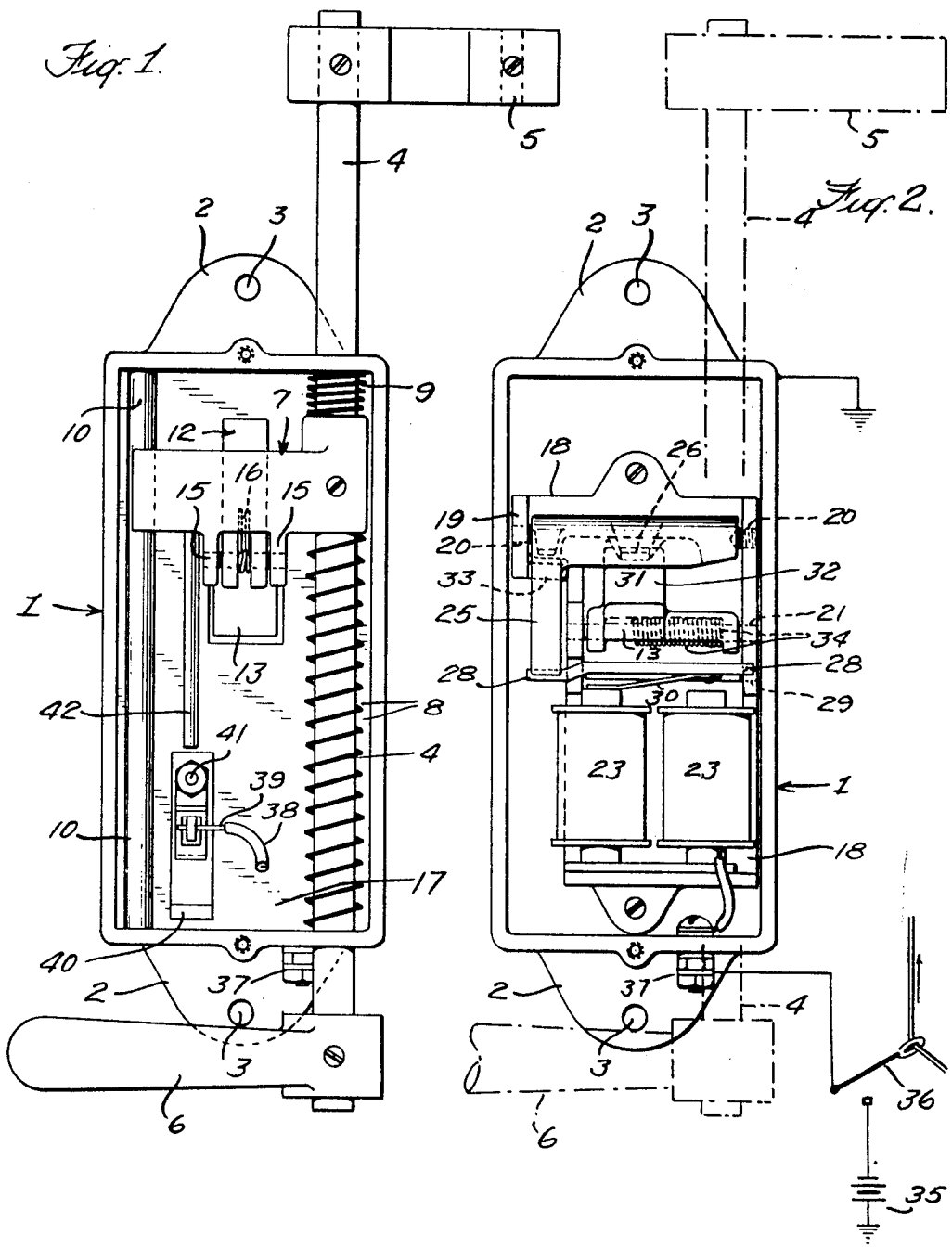
INVENTOR
EDWARD VOSSEN
BY Milton M Lichter
ATTORNEY June 2, 1942.  E. VOSSEN  2,285,237
ELECTRIC STOP MOTION CONTROLLER FOR KNITTING MACHINES
Filed Dec. 29, 1941  2 Sheets-Sheet 2
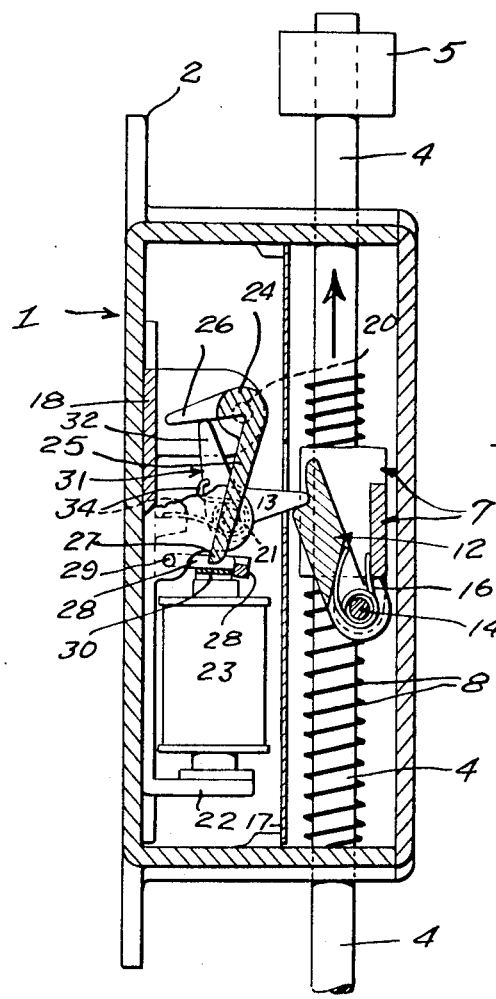
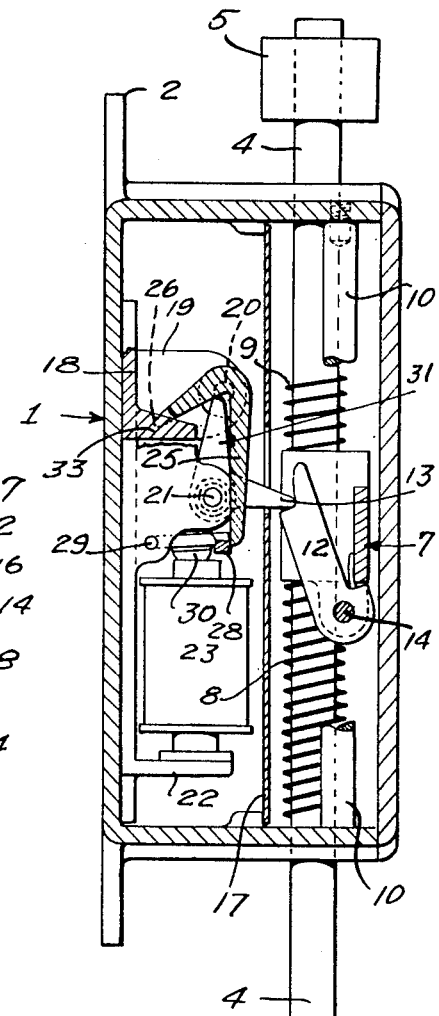
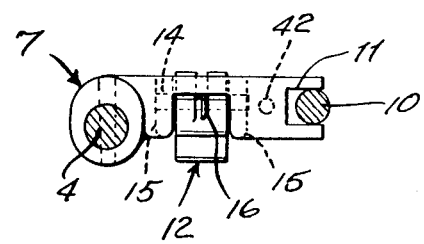
INVENTOR
EDWARD VOSSEN.
BY Milton M. Leichter
ATTORNEY Patented June 2, 1942

2,285,237

UNITED STATES PATENT OFFICE 2,285,237

ELECTRIC STOP MOTION CONTROLLER FOR KNITTING MACHINES

Edward Vossen, Brooklyn, N. Y., assignor to Stop Motion Devices Corporation, Brooklyn, N. Y., a corporation of New York Application December 29, 1941, Serial No. 424,793

3 Claims. (Cl. 66—163)

This invention is an improved controller for use with knitting machines and other power driven machines as a part of an electrically actuated stop motion system governed by conditions in the material operated on. It is designed to meet, among others, the principal difficulty in this art of operably coupling a spring actuated thrust bar to an electrically actuated release mechanism by means of a latch pawl in such manner that the action of the controller in shifting the stop mechanism of the machine is rapid, accurate and proof against accidental discharge, in spite of the high and irregular vibrations inseparable from the operation of such machines. Essential elements present are an ample holding surface by the latch mechanism against the pawl, minimum vibration between the rod assemblage and the latch mechanism in normal operation, and a quick and full clearance between pawl and latch on discharging.

Fig. 1 shows a front view of the interior of the controller, the face of the housing being removed, but the inner dust shield which conceals part of the mechanism remaining in place.

Fig. 2 shows so much of the interior mechanism as is concealed in Fig. 1 by the dust shield. The figure also indicates the electric circuit and the circuit closer under control of the thread operated on.

Fig. 3 shows the controller rotated to the right from the position shown in Fig. 1, with the side of the housing removed to disclose the interior. Enough details of the latch mechanism are shown to indicate their method of operation.

Fig. 4 is a top plan view of the pawl carrier as bolted into position on the thrust rod.

Fig. 5 shows the controller in the act of discharging.

The controller consists of a housing (Fig. 1) ordinarily metal, having end ears 2—2 and bolt holes 3—3 for attachment to the machine. Toward one side of housing 1 a thrust rod 4 passes therethrough by means of apertures in the opposite ends of said housing, which hold said rod against transverse movement but permit longitudinal movement. A bracket arm 5 is fixed at one end of rod 4 to make connection with the stop handle of the knitting machine and to actuate it by the shift of rod 4 to cut off the driving current. Toward the opposite exterior end of thrust rod 4 is attached the loading handle 6 for the operator's convenience in drawing said rod into loaded position. Adjustably but firmly attached to said rod and extending transversely therefrom across housing 1 is the pawl carrier 7 of sturdy construction. A spiral mainspring 8 is mounted on thrust rod 4 with its lower end on the floor of housing 1 and its upper end against pawl carrier 7, and at all times exerts its pressure to drive rod 4 with the pawl carrier 7 attached upward in the direction of bracket arm 5. Mounted also on thrust rod 4 but on the opposite side of pawl carrier 7 from mainspring 8 is the cushion spring 9 to absorb the impact of the pawl carrier against the ceiling of the housing as the controller is discharged.

Passing longitudinally through housing 1 on the opposite side from and parallel to rod 4 is stay bar 10, firmly fixed in position. The unattached end of transverse pawl carrier 7 is milled to a recess 11 (Fig. 4) which in position fits closely around stay bar 10, leaving said pawl carrier with free longitudinal play on said stay bar, but closely limiting said carrier against any vibration circumferential to said thrust rod 4.

A latch pawl 12 is mounted on said pawl carrier 7 (Figs. 3, 4, 5) for engagement with latch lip 13 of the release mechanism, said pawl rotating in bearings upon pivot pin 14 (Fig. 5) resting in studs 15—15 (Fig. 1) extending from pawl carrier 7. A wire spring 16 (Figs. 2, 4, 5) is mounted on said pivot pin 14, bears with one end against said pawl carrier, and with the other end presses said pawl 12 toward engagement with said latch lip 13.

The latch mechanism (Figs. 2, 3, 5) is attached to a bed plate 18 fixed interiorly to the back or farther side of housing 1. At the upper portion of said bed plate its two sides are brought forward at right angles into flanges 19, bored to form bearings for the latch lever pivot 20—20 and the rocker pivot 21 (Figs. 2, 3, 5). The lower end of said bed plate is similarly brought forward at right angles to form a base 22 (Fig. 5) for the twin cores of the electromagnet 23.

The latch lever 24 (Figs. 2, 3, 5) has a transverse pivotal portion turning in bearings 20—20 bored in the raised flanges 19 and from one end of this transverse portion and radially and at right angles thereto a latch arm 25 extends toward the electromagnet 23. An interior counterarm 26 also extends radially at right angles from the transverse pivotal portion of latch lever 24, but at a different radial angle from latch arm 25. The end 27 of said latch arm 25 normally, and at all times except when the controller is in process of discharge, engages the edge, or a lug extension thereof, of an armature plate 28 (Fig. 1), the opposite edge of which (Figs. 3, 5) is hinged on a pivot 29 in flanges 19. Normally said armature lies at right angles to the twin cores of electromagnet 23, but held therefrom by an opposing spring 30 which rests with one end against a core and the other against said armature (Fig. 2).

Rocker 31 (Figs. 2, 3, 5) has a transverse pivotal portion mounted on a pivot rod 21—21 which turns in bearings in the flanges 19. Fixed to said pivot portion and extending therefrom radially and at right angles through the opening in dust shield 17 (Figs. 1, 3, 5) is an arm 13 thereof whose end forms the latch lip cooperating with pawl 12. A counterarm 32 also extends radially and at right angles from said pivotal portion of rocker 31 but at a different radial angle from said arm 13, said counterarm being spaced on said pivotal portion so as to meet and cooperate with the interior arm 26 of latch lever 24 (Fig. 5). A stud 33 is set in flange 19 (Fig. 3) to meet another stud set in latch lever 24, not shown, and limit the return rotation of latch arm 25 after discharge. A wire spring 34 (Figs. 2, 5) is mounted on the pivot rod 21 of rocker 31, with one end thereof bearing against bed plate 18 and the other end pressing against counterarm 32 of rocker 31, to rotate said counterarm and rocker till said counterarm is stopped by its arrival at the V-angle of the pivotal portion of latch lever 24 (Figs. 5, 6) and latch lip 13 extends toward thrust rod 4, remaining there except when in the act of discharge the rocker is unlocked and the pawl rotates it (Figs. 3, 5).

The electric circuit (Figs. 1, 2) starts at the source 35 and passes through the end detector or knot detector circuit breaker 36, thence by insulating screw 37 into housing 1 and through the coils of the electromagnet 23, thence by wire 38 through dust shield 17 and through a suitably resilient connection 39 to a leaf spring 40 attached by insulating screw 41 to said dust shield and housing. A contact bar 42 extends down from pawl carrier 7 in position to connect with leaf spring 40 when the carrier is drawn down to loaded position. Carrier 7 connects with housing 1, which is grounded.

To load the controller for normal operation the operator passes the thread through knot detector or end detector circuit breaker 36 (Fig. 2), which remains open, and pulls down loading handle 6 (Fig. 1) till the pawl 12, resiliently mounted on its pivot 14 with its controlling spring 16, passes beneath the extended latch lip 13, and on release of pressure by the operator engages therewith (Fig. 3). The upward pressure of mainspring 8 against latch lip 13 tends to rotate rocker 31 counterclockwise, but the extreme end 32 of rocker 31 is held in the V-angle at the pivotal part of latch lever 24, the latch arm 25 of which has passed beyond and been caught by the free edge of armature 28. The retraction of thrust rod 4 by the operator, bringing down pawl carrier 7, makes connection between contact bar 42 and leaf spring 40 (Fig. 1), and the electric circuit is complete except as broken at circuit closer 36.

If in the course of normal operation a defect in the travelling thread arrives at circuit closer 36 and causes it to close, the resulting current energizes electromagnet 23, drawing armature 28 down toward the magnet and out of engagement with the latch arm 25, the end of which 27 has been locked against said armature (Fig. 5), thereby releasing both latch lever 24 and rocker 31 restrained by it, whereby latch lip 13 is rotated clear by pawl 12 actuated by mainspring 8, thrust rod 4 rises, and by means of bracket 5 moves the stop handle of the machine to cut off the power. The rise of the pawl carrier 7 breaks connection between contact bar 42 and leaf spring 40, saving waste of electricity after discharge and sparing the operator a shock on making replacement.

I claim:

1. In an electric stop mechanism for mechanically stopped power driven machines, the combination with a circuit closer governed by the material operated on, of a controller comprising a housing, means of connecting said housing with the machine, opposing apertures in the ends of said housing, a rod passing through said housing and apertures and by the latter held longitudinally movable but fixed against transverse movement, means on said rod to transfer its motion to the mechanism of said machine, a mainspring impelling said rod, a bar attached to said housing parallel to said rod, a pawl carrier member attached at one end thereof to said rod and extending transversely therefrom to said bar, a mortise milled in the unattached end of said pawl carrier and embracing said bar so as to be longitudinally movable thereon but closely held against circumferential movement upon said rod as axis, a pawl pivoted to said carrier, a rocker member pivoted to said housing, a spring to rotate said pawl on said carrier into engagement with said rocker member, a spring to move said rocker member into position to engage said pawl, an electromagnet attached to but insulated from said housing, an armature pivoted on said housing and under control of said electromagnet, a latch member pivoted to said housing and cooperating with said armature so that when the circuit carrying the stoppage actuating current is open said latch member is engaged and held locked against movement by said armature and in turn engages said pawl and holds it together with said pawl carrier and rod against movement under actuation of said mainspring, and when said circuit is closed the stoppage actuating current energizes said electromagnet to shift said armature out of locking position with reference to said latch member and release the latter, and thereby said rod to move under actuation of said mainspring and transfer its motion to the stoppage mechanism of said power driven machine.

2. In a controller as part of an electric stop mechanism for power driven machines, a rod, means on said rod to transmit the motion thereof to said machine, means holding said rod to permit longitudinal but not transverse movement thereof, a spring impelling said rod, a bar fixed parallel to said rod, a transverse member fixed at one end thereof to said rod, a pawl attached to said transverse member, an actuatable member to engage and hold said pawl against movement until released, means at the unattached end of said transverse member to embrace said bar so as to permit movement of said transverse member and rod parallel with said bar but to hold said transverse member against circumferential movement with reference to said rod as axis.

3. In a controller as part of an electric stop motion for power driven machines, a rod, means thereon to transfer the motion of said rod to the machine, means holding said rod to permit longitudinal but not transverse movement thereof, a spring impelling said rod, a transverse member fixed at one end to said rod, a pawl attached to said transverse member, an actuatable member to engage and hold said pawl against movement until released, means at the unattached end of said transverse member to hold said transverse member during normal operation against circumferential movement with reference to said rod as axis.

EDWARD VOSSEN.